(12) United States Patent
Weaver et al.

(10) Patent No.: US 6,679,393 B1
(45) Date of Patent: Jan. 20, 2004

(54) RELEASABLE LOCKING DEVICE

(75) Inventors: Carlton David Weaver, Goodells, MI (US); Linda P. Lascara, Goodlettsville, TN (US)

(73) Assignee: Unarco Material Handling, Inc., Springfield, TN (US)

( * ) Notice: Subject to any disclaimer, the term of this patent is extended or adjusted under 35 U.S.C. 154(b) by 0 days.

(21) Appl. No.: 10/263,823

(22) Filed: Oct. 3, 2002

(51) Int. Cl.[7] .................................................. A47F 5/00
(52) U.S. Cl. .................. 211/192; 248/221.11; 403/321; 403/327
(58) Field of Search ................................ 211/192, 189, 211/191; 248/221.11, 221.12; 403/321, 322.1, 324, 326, 327

(56) References Cited

U.S. PATENT DOCUMENTS

| | | | |
|---|---|---|---|
| 702,589 A | | 6/1902 | Rast |
| 2,422,693 A | * | 6/1947 | McArthur |
| 3,330,583 A | * | 7/1967 | Kennedy et al. |
| 4,074,812 A | | 2/1978 | Skubic et al. |
| 5,237,791 A | | 8/1993 | Scanlan |
| 5,624,045 A | | 4/1997 | Highsmith et al. |
| 5,788,192 A | * | 8/1998 | Poole ................. 248/221.11 X |
| 5,938,367 A | * | 8/1999 | Olson .................... 211/192 X |
| 6,155,441 A | | 12/2000 | Andersen et al. |
| 6,203,234 B1 | * | 3/2001 | Olson .................... 211/192 X |
| 6,230,910 B1 | | 5/2001 | Olsson et al. |
| 6,241,109 B1 | | 6/2001 | Kautz et al. |
| 6,352,164 B1 | | 3/2002 | Hyatte et al. |
| 6,575,656 B2 | * | 6/2003 | Suh |
| 6,595,379 B1 | * | 7/2003 | Powell ........................ 211/192 |

FOREIGN PATENT DOCUMENTS

GB    2044079 A    10/1980

OTHER PUBLICATIONS

US 2002/0153341 A1, Oct.–2002, May et al.*

* cited by examiner

*Primary Examiner*—Robert W. Gibson, Jr.
(74) *Attorney, Agent, or Firm*—Wood, Phillips, Katz, Clark & Mortimer

(57) ABSTRACT

In a releasable locking device, which is useful at a beam-to-column connection in a storage rack, a housing having a lateral wall with two parallel slots has an end wall at an outer end and is open at the inner end, a locking pin having an internal portion movable within and along the lateral wall is movable between a retracted position and an extended position, toward which the locking pin is biased, and an outer sleeve is movable outside and along the lateral wall of the housing and is connected to the locking pin via a connecting pin extending through the locking pin, through the parallel slots, at each end to the outer sleeve. The outer sleeve has an external flange to facilitate pulling of the outer sleeve to move the locking pin toward the retracted position.

6 Claims, 2 Drawing Sheets

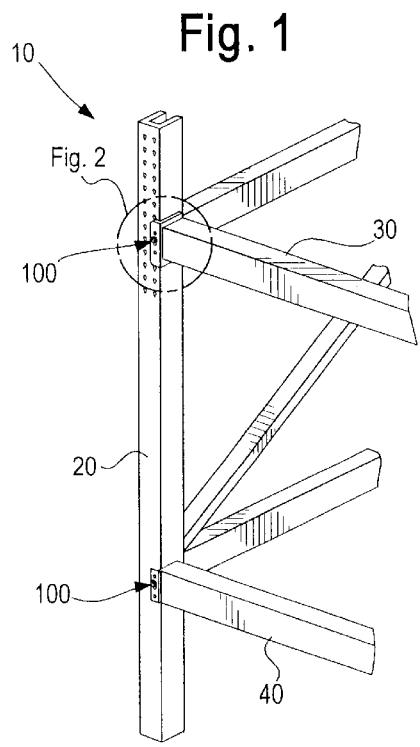
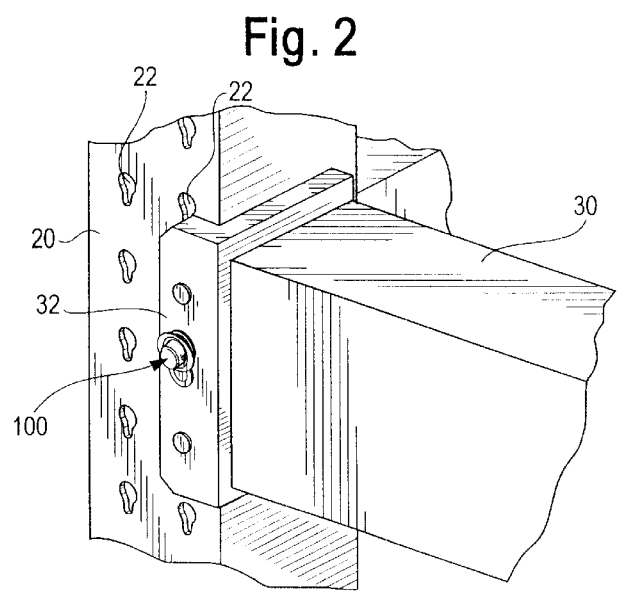
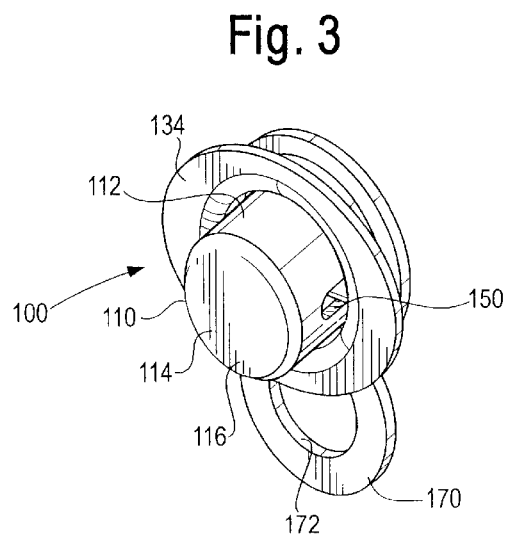

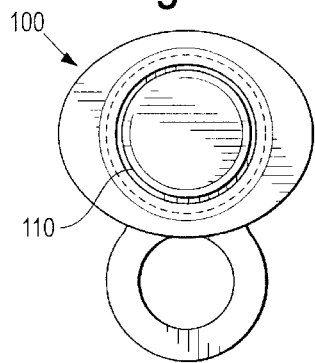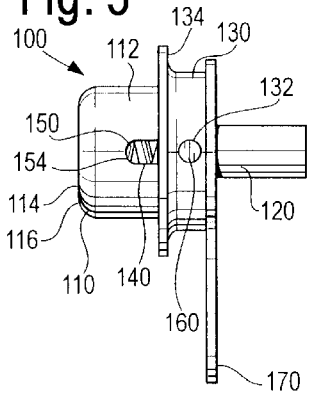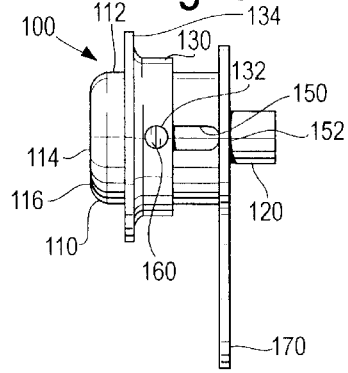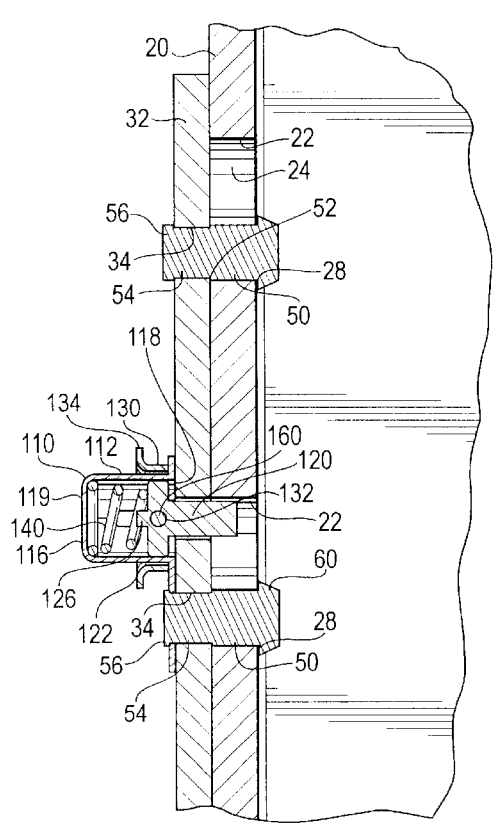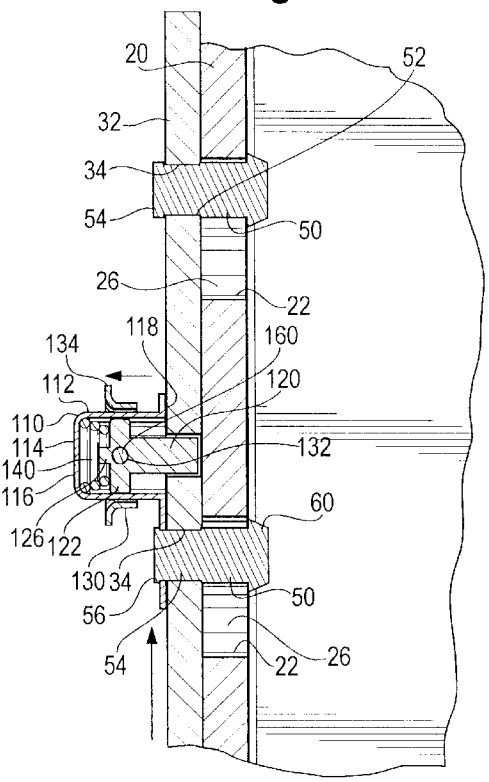

RELEASABLE LOCKING DEVICE

TECHNICAL FIELD OF THE INVENTION

This invention pertains to a releasable locking device, which has an intended use at a beam-to-column connection in a storage rack, such as a pallet rack. This invention also pertains to a storage rack, such as a pallet rack, which comprises the releasable locking device.

BACKGROUND OF THE INVENTION

In a storage rack, it is common to connect a beam to a column via a flanged member having a side flange welded to one end of the beam and a front flange, from which fasteners having inner heads project into similarly shaped apertures in a front wall of the column. Commonly, the apertures are shaped so that the inner heads of the fasteners can pass through upper regions of the apertures but not through lower regions of the apertures. Thus, the flanged member must be lifted to permit the inner heads of the fasteners to pass through upper regions of the apertures.

At an early date, it was realized that if the beam or the flanged member were struck by an object, such as a pallet, as the object was being lifted, the object could dislodge the flanged member from the column unless a latching or locking device was provided. Various latching or locking devices have been disclosed for latching or locking beams to columns.

Many prior patents disclose such latching or locking devices at beam-to-column connections in storage racks. One example is disclosed in U.S. Pat. No. 5,624,045 and U.S. Pat. No. 5,713,367, in which the fasteners are described as connecting pins and the disclosures of which are incorporated herein by reference. Other examples, which employ spring-biased pins, are disclosed in U.S. Pat. No. 3,330,583, in U.S. Pat. No. 4,074,814, the disclosure of which is incorporated herein by reference, and in U.S. Pat. Nos. 5,938,367 and 6,203,234, U.S. Pat. No. 6,155,441, U.S. Pat. No. 6,230,910, and U.S. Pat. No. 6,352,164. A latching or locking device of related interest is disclosed in U.S. Pat. No. 2,442,693.

SUMMARY OF THE INVENTION

This invention provides a releasable locking device comprising a housing, a locking pin, and an outer sleeve, which a user can pull to release the releasable locking device. The housing has a lateral wall, which has an elongate slot, an outer end, and an inner end. The housing has an end wall closing the outer end and is open at the inner end. The locking pin, which has a internal portion movable inside and along the lateral wall of the housing and which has a locking portion, is movable between a retracted position wherein the internal portion of the locking pin is spaced from the end wall of the housing by a comparatively lesser distance and an extended position wherein the locking portion of the locking pin extends from the inner end of the housing and wherein the internal portion of the locking pin is spaced from the end wall of the housing by a comparatively greater distance.

The locking pin is biased, as by a coiled spring acting between the end wall of the housing and the internal portion of the locking pin or by an elastomeric member acting therebetween, toward the extended position. The outer sleeve, which is movable outside and along the lateral wall of the housing, is connected to the locking pin via a connecting pin extending from the locking pin, through the elongate slot. The outer sleeve is connected to an end of the connecting pin.

Preferably, the elongate slot has two closed ends, which limit movement of the locking pin between the retracted and extended positions. Preferably, the elongate slot is one of two parallel slots, each slot being located on an opposite side of the lateral wall of the housing, the connecting pin extending through the locking pin, through each slot, and being connected to the outer sleeve at each end of the connecting pin. Preferably, the outer sleeve has a flange to facilitate pulling of the outer sleeve to move the locking pin toward the retracted position.

This invention also provides a storage rack comprising a column, a beam, and a releasable locking device, as described above. The column has a vertical array of fastener-receiving apertures, each having an upper region and a lower region and each having a margin, and a beam having an end flange, to which plural fasteners are mounted. Each fastener has a distal portion adapted to be inserted into the upper region of an associated one of the fastener-receiving apertures and to engage an inner margin of the same one of the fastener-receiving apertures, at the lower region of the associated one of said apertures, so as to prevent the distal end from being withdrawn unless and until the distal portion is elevated.

Many prior patents disclose such latching or locking devices at beam-to-column connections in storage racks. One example is disclosed in U.S. Pat. No. 5,624,045, in which the fasteners are described as connecting pins and the disclosure of which is incorporated herein by reference. Other examples, which employ spring-biased pins, are disclosed in U.S. Pat. No. 3,330,583, U.S. Pat. Nos. 5,938,367and 6,203,234, U.S. Pat. No. 6,155,441, U.S. Pat. No. 6,230,910, and U.S. Pat. No. 6,352,164.

In the storage rack provided by this invention, the housing of the releasable storage device is mounted to the end flange and opens at the inner end of the housing to a hole in the end flange. The hole is aligned with the upper region of a selected one of the fastener-receiving apertures, whereby, in the extended position, the locking pin extends through the hole in the end flange, into the upper region aligned with the hole.

BRIEF DESCRIPTION OF THE DRAWINGS

FIG. 1 is a simplified, fragmentary, isometric view of a storage rack, such as a pallet rack, embodying this invention and comprising a column, an upper beam and a lower beam, and, where each of the upper and lower beams is connected to the column, a releasable locking device embodying this invention. FIG. 2, on a larger scale, is a detail taken from a region indicated in FIG. 1, where the upper beam is connected to the column.

FIGS. 3, 4, 5, and 6, on a larger scale compared to FIG. 1, illustrate the releasable locking device, apart from the storage rack. FIG. 3 is a perspective view. FIG. 4 is a front elevation. FIG. 5 is a side elevation, which is taken from the right side of the releasable locking device, as shown in FIG. 4, and in which a locking pin is illustrated in an extended position. FIG. 6 is a side elevation, which is taken from the right side of the releasable locking device, as shown in FIG. 4, and in which the locking pin is illustrated in a retracted position.

FIGS. 7 and 8, on a smaller scale compared to FIGS. 3, 4, 5, and 6, are fragmentary cross-sections taken along a vertical pane, through an end flange of the upper beam, through the column, through two connecting pins, and through the releasable locking device. In FIG. 7, the locking pin is illustrated in the extended position. In FIG. 8, the locking pin is illustrated in the retracted position.

DETAILED DESCRIPTION OF THE ILLUSTRATED EMBODIMENT

As illustrated in FIG. 1, a storage rack 10 comprises a column 20, an upper beam 30 and a lower beam 40, and, where each beam 30, 40, is connected to the column 20, a releasable locking device 100 embodying this invention. The column 20 has two vertical arrays of fastener-receiving apertures 22, each aperture 22 having an upper region 24 and a lower region 26 and each having an inner margin 28. The beams.30, 40, are similar and are connected similarly to the column 20.

As illustrated in FIGS. 1, 2, 7, and 8, the upper beam 30 has an end flange 32, to which plural connecting pins 50 are mounted. Each connecting pin 50 is stepped so as to define a shoulder 52 and so as to define a proximal portion 54, which is passed outwardly through a hole 34 in the end flange 32, until the shoulder 52 bears against an inner margin 36 of the hole 34, whereupon the proximal portion 54 is swaged, as a rivet is swaged conventionally, so as to provide a proximal head 56 on the proximal portion 54 of said connecting pin 50. Each connecting pin 50 has a distal head 60, which is adapted to be inserted into the upper region 24 of an associated aperture 22 and to overhang the inner margin 28 of the associated aperture 22, at the lower region 26 of the associated aperture 22, so as to prevent the distal head from being withdrawn unless and until the distal head 60 is elevated until the distal head 60 is aligned with the upper region 24 of the associated aperture 22. Thus, except that a selected one of the connecting pins 50 is used also to mount the releasable locking device 100 in a manner to be later described, the upper beam 30 is mounted to the column 20 in a manner disclosed in U.S. Pat. Nos. 5,624,045 and 5,713,367, supra.

The releasable locking device 100 comprises a housing 110, which defines an axis, a locking pin 120, and an outer sleeve 130, which a user can pull to release the releasable locking device 100. The housing 110 has a tubular, lateral wall 112, which defines an axis, an outer end 114, which is closed by an end wall 116, and an inner end 118, which is open. The locking pin 120, which defines an axis and is coaxial with the housing wall 112, which has a flanged portion 122 movable inside and along the lateral wall 112, which has a locking portion 124 extending inwardly, and which has an axial stub 126 extending outwardly, is movable between a retracted position and an extended position. In the retracted position, the locking portion 124 extends from the open end 118 of the housing 110 by a comparatively lesser distance, by which the flanged portion 122 is spaced from the housing wall 116. In the extended position, the locking portion 124 extends from the open end 118 of the housing 110 by a comparatively greater distance, by which the flanged portion 122 is spaced from the housing wall 118.

The locking pin 120 is biased, by a coiled spring 140 piloted around the axial stub 126 and acting between the housing wall 116 and the flanged portion 122, toward the extended position. An elastomeric member (not illustrated) acting between the housing wall 116 and the flanged portion 122 may be instead used to bias the locking pin 120 toward the extended position. The outer sleeve 130 is fitted around the housing wall 112 so as to be axially movable outside and along the housing wall 112. The housing wall 112 has two elongate, parallel slots 150, each having a closed, inner end 152 and a closed, outer end 154. A cross pin 160 extends through a hole 162 in the locking pin 120, through the flanged portion 22. Each end 164 of the cross pin 150 extends through one of the elongate, parallel slots 150 and fits with an interference fit into a hole 132 in the outer sleeve 130 so as to connect the outer sleeve 130 to the locking pin 120. The closed ends 152, 154, of the parallel slots 150 limit movement of the cross pin 160, so as to limit movement of the locking pin 120 between the retracted and extended positions. Thus, as the outer sleeve 130 is moved along the housing wall 112, the latching pin 120 is moved with the outer sleeve 130.

The housing 110 has an integral, lower tab 170, which has a hole 172 to accommodate the proximal portion 54 of the selected one of the connecting pins 50, before the proximal portion 54 thereof is swaged, as a rivet is swaged conventionally, so as to provide a proximal head 56 on the proximal portion 54 thereof. The lower tab 170 is arranged to align the locking portion 124 of the locking pin 120 with the upper region 24 of the associated aperture 22. Thus, the selected one of the connecting pins 50 not only coacts with the other connecting pins 50 to mount the upper beam 30 to the column 20 but also mounts the releasable locking device 100 to the end flange 32 of the upper beam 30 so that, when the upper beam 30 is mounted to the column 20, the locking portion 124 of the locking pin 120 snaps automatically into the upper region 24 of the associated aperture 22.

The outer sleeve 130 has an outer flange 134, which facilitates pulling of the outer sleeve 130 to move the locking pin 120 toward the retracted position, whereby to withdraw the locking portion 124 of the locking pin 120 from the upper region 24 of the associated aperture 22. Thus, a user pressing the thumb of one hand against the housing wall 116 and pulling on the outer flange 134 with the next two fingers can pull the locking pin 120 toward the retracted position, whereby to release the releasable locking device 100.

Although a releasable locking device embodying this invention has an intended use at a beam-to-column connection in a storage rack, such as a pallet rack, a releasable locking device embodying this invention may prove to have other similar and dissimilar uses.

What is claimed is:

1. A releasable locking device comprising
   (a) a housing, which housing has a lateral wall, an outer end, and an inner end, which housing has an end wall closing the outer end, and which housing is open at the inner end, the lateral wall having an elongate slot,
   (b) a locking pin, which locking pin has a internal portion movable inside and along the lateral wall of the housing, which locking pin has a locking portion, which locking pin is movable between a retracted position wherein the internal portion of the locking pin is spaced from the end wall of the housing by a comparatively lesser distance and an extended position wherein the locking portion of the locking pin extends from the inner end of the housing and wherein the internal portion of the locking pin is spaced from the end wall of the housing by a comparatively greater distance, and which locking pin is biased toward the extended position, and
   (c) an outer sleeve, which outer sleeve is movable outside and along the lateral wall of the housing and which outer sleeve is connected to the locking pin via a connecting pin extending from the locking pin, through the elongate slot, the outer sleeve being connected to an end of the connecting pin and having an external flange to facilitate pulling of the outer sleeve to move the locking pin toward the retracted position.

2. The releasable locking device of claim 1 wherein the elongate slot is one of two parallel slots, each slot being located on an opposite side of the lateral wall of the housing, the connecting pin extending through the locking pin, through each slot, and being connected to the outer sleeve at each end of the connecting pin.

3. The releasable locking device of claim 1 wherein the elongate slot has two closed ends, which limit movement of the locking pin between the retracted and extended positions.

4. The releasable locking device of claim 3 wherein the elongate slot is one of two parallel slots, each slot being located on an opposite side of the lateral wall of the housing, the connecting pin extending through the locking pin, through each slot, and being connected to the outer sleeve at each end of the connecting pin.

5. A storage rack comprising (a) a column having a vertical array of fastener-receiving apertures, each aperture having an upper region and a lower region and each aperture having an inner margin, (b) a beam having an end flange, to which plural fasteners are mounted, each fastener having a distal portion adapted to be inserted into the upper region of an associated one of the fastener-receiving apertures and to overhang the inner margin of the same one of the fastener-receiving apertures, at the lower region of the associated one of said apertures, so as to prevent the distal portion from being withdrawn unless and until the distal portion is elevated, and (c) the releasable locking device of any one of claims 1 through 4, the housing being mounted to the end flange and opening at the inner end of the housing to a hole in the end flange, the hole being aligned with the upper region of a selected one of the fastener-receiving apertures, whereby, in the extended position, the locking pin extends through the hole in the end flange, into the upper region aligned with the hole.

6. A storage rack comprising (a) a column having a vertical array of fastener-receiving apertures, each aperture having an upper region and a lower region and each having an inner margin, (b) a beam having an end flange, to which plural fasteners are mounted, each fastener having a distal portion adapted to be inserted into the upper region of an associated one of the fastener-receiving apertures and to overhang the inner margin of the same one of the fastener-receiving apertures, at the lower region of the associated one of said apertures, so as to prevent the distal portion from being withdrawn unless and until the distal portion is elevated, and (c) the releasable locking device of any one of claims 1 through 4, the housing being mounted to the end flange and opening at the inner end of the housing to a hole in the end flange, the hole being aligned with the upper region of a selected one of the fastener-receiving apertures associated with the fasteners, whereby, in the extended position, the locking portion of the locking pin extends through the hole in the end flange, into the upper region aligned with the hole in the end flange and whereby, in the retracted position, the locking portion of the locking pin does not extend into the upper region aligned with the hole in the end flange.

* * * * *